(12) United States Patent
Raichelgauz et al.

(10) Patent No.: US 10,776,585 B2
(45) Date of Patent: Sep. 15, 2020

(54) SYSTEM AND METHOD FOR RECOGNIZING CHARACTERS IN MULTIMEDIA CONTENT

(71) Applicant: Cortica, Ltd., Tel Aviv (IL)

(72) Inventors: Igal Raichelgauz, New York, NY (US); Karina Odinaev, New York, NY (US); Yehoshua Y. Zeevi, Haifa (IL)

(73) Assignee: CORTICA, LTD., Tel Aviv (IL)

( * ) Notice: Subject to any disclaimer, the term of this patent is extended or adjusted under 35 U.S.C. 154(b) by 1150 days.

(21) Appl. No.: 14/638,210

(22) Filed: Mar. 4, 2015

(65) Prior Publication Data

US 2015/0199336 A1 Jul. 16, 2015

Related U.S. Application Data

(63) Continuation-in-part of application No. 14/096,865, filed on Dec. 4, 2013, now abandoned, which is a (Continued)

(30) Foreign Application Priority Data

Oct. 26, 2005 (IL) .......................................... 171577
Jan. 29, 2006 (IL) .......................................... 173409
Aug. 21, 2007 (IL) .......................................... 185414

(51) Int. Cl.
*G06F 40/40* (2020.01)
*H04H 60/37* (2008.01)
(Continued)

(52) U.S. Cl.
CPC ......... *G06F 40/40* (2020.01); *G09B 19/0092* (2013.01); *H04H 60/37* (2013.01);
(Continued)

(58) Field of Classification Search
None
See application file for complete search history.

(56) References Cited

U.S. PATENT DOCUMENTS 4,733,353 A 3/1988 Jaswa
4,932,645 A 6/1990 Schorey et al.
(Continued)

FOREIGN PATENT DOCUMENTS

EP 1085464 A3 1/2007
WO 0231764 A2 4/2002
(Continued)

OTHER PUBLICATIONS

Srihari, Rohini K., Zhongfei Zhang, and Aibing Rao. "Intelligent indexing and semantic retrieval of multimodal documents." Information Retrieval 2.2-3 (2000): 245-275.*
(Continued)

*Primary Examiner* — Daniel T Pellett
(74) *Attorney, Agent, or Firm* — Reches Patent

(57) ABSTRACT

A system and method for recognizing characters embedded in multimedia content are provided. The method includes extracting at least one image of at least one character from a received multimedia content item; identifying a natural language character corresponding to the at least one image of the at least one character, wherein the identification is performed by a deep content classification (DCC) system; and storing the identified natural language character in a data warehouse.

24 Claims, 5 Drawing Sheets

Related U.S. Application Data continuation-in-part of application No. 13/624,397, filed on Sep. 21, 2012, now Pat. No. 9,191,626, which is a continuation-in-part of application No. 13/344,400, filed on Jan. 5, 2012, now Pat. No. 8,959,037, which is a continuation of application No. 12/434,221, filed on May 1, 2009, now Pat. No. 8,112,376, said application No. 13/624,397 is a continuation-in-part of application No. 12/195,863, filed on Aug. 21, 2008, now Pat. No. 8,326,775, which is a continuation-in-part of application No. 12/084,150, filed on Apr. 7, 2009, now Pat. No. 8,655,801, said application No. 13/624,397 is a continuation-in-part of application No. 12/084,150, filed as application No. PCT/IL2006/001235 on Oct. 26, 2006, now Pat. No. 8,655,801.

(60) Provisional application No. 61/948,050, filed on Mar. 5, 2014, provisional application No. 61/890,251, filed on Oct. 13, 2013.

(51) Int. Cl.
| | |
|---|---|
| *H04N 21/466* | (2011.01) |
| *H04H 60/59* | (2008.01) |
| *H04H 60/48* | (2008.01) |
| *H04N 21/258* | (2011.01) |
| *G09B 19/00* | (2006.01) |
| *H04N 7/173* | (2011.01) |
| *H04N 21/81* | (2011.01) |
| *H04N 21/2668* | (2011.01) |

(52) U.S. Cl.
CPC ............ *H04H 60/48* (2013.01); *H04H 60/59* (2013.01); *H04N 7/17318* (2013.01); *H04N 21/25891* (2013.01); *H04N 21/2668* (2013.01); *H04N 21/466* (2013.01); *H04N 21/8106* (2013.01); *H04H 2201/90* (2013.01)

(56) References Cited

U.S. PATENT DOCUMENTS

| | | | |
|---|---|---|---|
| 4,972,363 A | 11/1990 | Nguyen et al. | |
| 5,214,746 A | 5/1993 | Fogel et al. | |
| 5,307,451 A | 4/1994 | Clark | |
| 5,412,564 A | 5/1995 | Ecer | |
| 5,436,653 A | 7/1995 | Ellis et al. | |
| 5,568,181 A | 10/1996 | Greenwood et al. | |
| 5,638,425 A | 6/1997 | Meador et al. | |
| 5,745,678 A | 4/1998 | Herzberg et al. | |
| 5,763,069 A | 6/1998 | Jordan | |
| 5,806,061 A | 9/1998 | Chaudhuri et al. | |
| 5,835,901 A | 11/1998 | Duvoisin et al. | |
| 5,852,435 A | 12/1998 | Vigneaux et al. | |
| 5,864,855 A * | 1/1999 | Ruocco ................. G06F 16/355 |
| 5,870,754 A | 2/1999 | Dimitrova et al. | |
| 5,873,080 A | 2/1999 | Coden et al. | |
| 5,887,193 A | 3/1999 | Takahashi et al. | |
| 5,978,754 A | 11/1999 | Kumano | |
| 5,991,306 A | 11/1999 | Burns et al. | |
| 6,052,481 A | 4/2000 | Grajski et al. | |
| 6,070,167 A | 5/2000 | Qian et al. | |
| 6,076,088 A | 6/2000 | Paik et al. | |
| 6,122,628 A | 9/2000 | Castelli et al. | |
| 6,128,651 A | 10/2000 | Cezar | |
| 6,137,911 A | 10/2000 | Zhilyaev | |
| 6,144,767 A | 11/2000 | Bottou et al. | |
| 6,147,636 A | 11/2000 | Gershenson | |
| 6,163,510 A | 12/2000 | Lee et al. | |
| 6,243,375 B1 | 6/2001 | Speicher | |
| 6,243,713 B1 | 6/2001 | Nelson et al. | |
| 6,275,599 B1 | 8/2001 | Adler et al. | |
| 6,329,986 B1 | 12/2001 | Cheng | |
| 6,381,656 B1 | 4/2002 | Shankman | |
| 6,411,229 B2 | 6/2002 | Kobayashi | |
| 6,422,617 B1 | 7/2002 | Fukumoto et al. | |
| 6,507,672 B1 | 1/2003 | Watkins et al. | |
| 6,523,046 B2 | 2/2003 | Liu et al. | |
| 6,524,861 B1 | 2/2003 | Anderson | |
| 6,550,018 B1 | 4/2003 | Abonamah et al. | |
| 6,557,042 B1 | 4/2003 | He et al. | |
| 6,594,699 B1 | 7/2003 | Sahai et al. | |
| 6,601,026 B2 * | 7/2003 | Appelt ............. G06F 17/30616 704/9 |
| 6,611,628 B1 | 8/2003 | Sekiguchi et al. | |
| 6,618,711 B1 | 9/2003 | Ananth | |
| 6,643,620 B1 | 11/2003 | Contolini et al. | |
| 6,643,643 B1 | 11/2003 | Lee et al. | |
| 6,665,657 B1 | 12/2003 | Dibachi | |
| 6,681,032 B2 | 1/2004 | Bortolussi et al. | |
| 6,704,725 B1 | 3/2004 | Lee | |
| 6,732,149 B1 | 5/2004 | Kephart | |
| 6,742,094 B2 | 5/2004 | Igari | |
| 6,751,363 B1 | 6/2004 | Natsev et al. | |
| 6,751,613 B1 | 6/2004 | Lee et al. | |
| 6,754,435 B2 | 6/2004 | Kim | |
| 6,763,069 B1 | 7/2004 | Divakaran et al. | |
| 6,763,519 B1 | 7/2004 | McColl et al. | |
| 6,774,917 B1 | 8/2004 | Foote et al. | |
| 6,795,818 B1 | 9/2004 | Lee | |
| 6,804,356 B1 | 10/2004 | Krishnamachari | |
| 6,813,395 B1 | 11/2004 | Kinjo | |
| 6,819,797 B1 | 11/2004 | Smith et al. | |
| 6,845,374 B1 | 1/2005 | Oliver et al. | |
| 6,877,134 B1 | 4/2005 | Fuller et al. | |
| 6,901,207 B1 | 5/2005 | Watkins | |
| 6,938,025 B1 | 8/2005 | Lulich et al. | |
| 6,985,172 B1 | 1/2006 | Rigney et al. | |
| 7,006,689 B2 | 2/2006 | Kasutani | |
| 7,013,051 B2 | 3/2006 | Sekiguchi et al. | |
| 7,020,654 B1 | 3/2006 | Najmi | |
| 7,023,979 B1 | 4/2006 | Wu et al. | |
| 7,043,473 B1 | 5/2006 | Rassool et al. | |
| 7,158,681 B2 | 1/2007 | Persiantsev | |
| 7,199,798 B1 | 4/2007 | Echigo et al. | |
| 7,215,828 B2 | 5/2007 | Luo | |
| 7,260,564 B1 | 8/2007 | Lynn et al. | |
| 7,277,928 B2 | 10/2007 | Lennon | |
| 7,299,261 B1 | 11/2007 | Oliver et al. | |
| 7,302,117 B2 | 11/2007 | Sekiguchi et al. | |
| 7,313,805 B1 | 12/2007 | Rosin et al. | |
| 7,340,358 B2 | 3/2008 | Yoneyama | |
| 7,353,224 B2 | 4/2008 | Chen et al. | |
| 7,376,672 B2 | 5/2008 | Weare | |
| 7,433,895 B2 | 10/2008 | Li et al. | |
| 7,464,086 B2 | 12/2008 | Black et al. | |
| 7,529,659 B2 | 5/2009 | Wold | |
| 7,577,656 B2 | 8/2009 | Kawai et al. | |
| 7,657,100 B2 | 2/2010 | Gokturk et al. | |
| 7,660,468 B2 | 2/2010 | Gokturk et al. | |
| 7,694,318 B2 | 4/2010 | Eldering et al. | |
| 7,836,054 B2 | 11/2010 | Kawai et al. | |
| 7,860,895 B1 | 12/2010 | Scofield | |
| 7,933,407 B2 | 4/2011 | Keidar et al. | |
| 7,987,217 B2 | 7/2011 | Long et al. | |
| 8,023,739 B2 | 9/2011 | Hohimer et al. | |
| 8,036,893 B2 | 10/2011 | Reich | |
| 8,098,934 B2 | 1/2012 | Vincent | |
| 8,112,376 B2 | 2/2012 | Raichelgauz et al. | |
| 8,266,185 B2 | 9/2012 | Raichelgauz et al. | |
| 8,312,031 B2 | 11/2012 | Raichelgauz et al. | |
| 8,315,442 B2 | 11/2012 | Gokturk et al. | |
| 8,326,775 B2 | 12/2012 | Raichelgauz et al. | |
| 8,345,982 B2 | 1/2013 | Gokturk et al. | |
| 8,457,827 B1 | 6/2013 | Ferguson et al. | |
| 8,495,489 B1 | 7/2013 | Everingham | |
| 8,548,828 B1 | 10/2013 | Longmire | |
| 8,635,531 B2 | 1/2014 | Graham et al. | |
| 8,655,801 B2 | 2/2014 | Raichelgauz et al. | |
| 8,655,878 B1 | 2/2014 | Kulkarni et al. | |
| 8,677,377 B2 | 3/2014 | Cheyer et al. | |

(56) References Cited

U.S. PATENT DOCUMENTS

| | | |
|---|---|---|
| 8,682,667 B2 | 3/2014 | Haughay |
| 8,688,446 B2 | 4/2014 | Yanagihara |
| 8,706,503 B2 | 4/2014 | Cheyer et al. |
| 8,775,442 B2 | 7/2014 | Moore et al. |
| 8,799,195 B2 | 8/2014 | Raichelgauz et al. |
| 8,799,196 B2 | 8/2014 | Raichelquaz et al. |
| 8,818,916 B2 | 8/2014 | Raichelgauz et al. |
| 8,868,619 B2 | 10/2014 | Raichelgauz et al. |
| 8,868,861 B2 | 10/2014 | Shimizu et al. |
| 8,880,539 B2 | 11/2014 | Raichelgauz et al. |
| 8,880,566 B2 | 11/2014 | Raichelgauz et al. |
| 8,886,648 B1 | 11/2014 | Procopio et al. |
| 8,898,568 B2 | 11/2014 | Bull et al. |
| 8,922,414 B2 | 12/2014 | Raichelgauz et al. |
| 8,959,037 B2 | 2/2015 | Raichelgauz et al. |
| 8,990,125 B2 | 3/2015 | Raichelgauz et al. |
| 8,990,199 B1 | 3/2015 | Ramesh et al. |
| 9,009,086 B2 | 4/2015 | Raichelgauz et al. |
| 9,031,999 B2 | 5/2015 | Raichelgauz et al. |
| 9,087,049 B2 | 7/2015 | Raichelgauz et al. |
| 9,104,747 B2 | 8/2015 | Raichelgauz et al. |
| 9,165,406 B1 | 10/2015 | Gray et al. |
| 9,191,626 B2 | 11/2015 | Raichelgauz et al. |
| 9,197,244 B2 | 11/2015 | Raichelgauz et al. |
| 9,218,606 B2 | 12/2015 | Raichelgauz et al. |
| 9,235,557 B2 | 1/2016 | Raichelgauz et al. |
| 9,256,668 B2 | 2/2016 | Raichelgauz et al. |
| 9,323,754 B2 | 4/2016 | Ramanathan et al. |
| 9,330,189 B2 | 5/2016 | Raichelgauz et al. |
| 9,384,196 B2 | 7/2016 | Raichelgauz et al. |
| 9,438,270 B2 | 9/2016 | Raichelgauz et al. |
| 9,466,068 B2 | 10/2016 | Raichelgauz et al. |
| 9,646,006 B2 | 5/2017 | Raichelgauz et al. |
| 9,679,062 B2 | 6/2017 | Schillings et al. |
| 9,807,442 B2 | 10/2017 | Bhatia et al. |
| 9,875,445 B2 | 1/2018 | Amer et al. |
| 9,984,369 B2 | 5/2018 | Li et al. |
| 2001/0019633 A1 | 9/2001 | Tenze |
| 2001/0038876 A1 | 11/2001 | Anderson |
| 2001/0056427 A1 | 12/2001 | Yoon et al. |
| 2002/0010682 A1 | 1/2002 | Johnson |
| 2002/0010715 A1 | 1/2002 | Chinn et al. |
| 2002/0019881 A1 | 2/2002 | Bokhari et al. |
| 2002/0019882 A1 | 2/2002 | Soejima et al. |
| 2002/0032677 A1 | 3/2002 | Morgenthaler et al. |
| 2002/0037010 A1 | 3/2002 | Yamauchi |
| 2002/0038299 A1 | 3/2002 | Zernik et al. |
| 2002/0042914 A1 | 4/2002 | Walker et al. |
| 2002/0059069 A1† | 5/2002 | Hsu |
| 2002/0059580 A1 | 5/2002 | Kalker et al. |
| 2002/0072935 A1 | 6/2002 | Rowse et al. |
| 2002/0083468 A1† | 6/2002 | Dudkiewicz |
| 2002/0087530 A1 | 7/2002 | Smith et al. |
| 2002/0087828 A1 | 7/2002 | Arimilli et al. |
| 2002/0099870 A1 | 7/2002 | Miller et al. |
| 2002/0107827 A1 | 8/2002 | Benitez-Jimenez et al. |
| 2002/0113812 A1 | 8/2002 | Walker et al. |
| 2002/0126872 A1 | 9/2002 | Brunk et al. |
| 2002/0129140 A1 | 9/2002 | Peled et al. |
| 2002/0129296 A1 | 9/2002 | Kwiat et al. |
| 2002/0143976 A1 | 10/2002 | Barker et al. |
| 2002/0147637 A1 | 10/2002 | Kraft et al. |
| 2002/0152267 A1 | 10/2002 | Lennon |
| 2002/0157116 A1 | 10/2002 | Jasinschi |
| 2002/0159640 A1 | 10/2002 | Vaithilingam et al. |
| 2002/0161739 A1 | 10/2002 | Oh |
| 2002/0163532 A1 | 11/2002 | Thomas |
| 2002/0174095 A1 | 11/2002 | Lulich et al. |
| 2002/0178410 A1 | 11/2002 | Haitsma et al. |
| 2002/0184505 A1 | 12/2002 | Mihcak et al. |
| 2003/0005432 A1 | 1/2003 | Ellis et al. |
| 2003/0028660 A1 | 2/2003 | Igawa et al. |
| 2003/0037010 A1 | 2/2003 | Schmelzer |
| 2003/0041047 A1 | 2/2003 | Chang et al. |
| 2003/0050815 A1 | 3/2003 | Seigel et al. |
| 2003/0078766 A1 | 4/2003 | Appelt et al. |
| 2003/0086627 A1 | 5/2003 | Berriss et al. |
| 2003/0089216 A1 | 5/2003 | Birmingham et al. |
| 2003/0093790 A1 | 5/2003 | Logan et al. |
| 2003/0101150 A1 | 5/2003 | Agnihotri |
| 2003/0105739 A1 | 6/2003 | Essafi et al. |
| 2003/0115191 A1 | 6/2003 | Copperman et al. |
| 2003/0126147 A1 | 7/2003 | Essafi et al. |
| 2003/0182567 A1 | 9/2003 | Barton et al. |
| 2003/0184598 A1 | 10/2003 | Graham |
| 2003/0200217 A1 | 10/2003 | Ackerman |
| 2003/0217335 A1 | 11/2003 | Chung et al. |
| 2003/0229531 A1 | 12/2003 | Heckerman et al. |
| 2004/0003394 A1 | 1/2004 | Ramaswamy |
| 2004/0025180 A1 | 2/2004 | Begeja et al. |
| 2004/0068510 A1 | 4/2004 | Hayes et al. |
| 2004/0095376 A1 | 5/2004 | Graham et al. |
| 2004/0098671 A1 | 5/2004 | Graham et al. |
| 2004/0107181 A1 | 6/2004 | Rodden |
| 2004/0111432 A1 | 6/2004 | Adams et al. |
| 2004/0111465 A1 | 6/2004 | Chuang et al. |
| 2004/0117367 A1 | 6/2004 | Smith et al. |
| 2004/0117638 A1 | 6/2004 | Monroe |
| 2004/0128142 A1 | 7/2004 | Whitham |
| 2004/0128511 A1 | 7/2004 | Sun et al. |
| 2004/0133927 A1 | 7/2004 | Sternberg et al. |
| 2004/0153426 A1 | 8/2004 | Nugent |
| 2004/0215663 A1 | 10/2004 | Liu et al. |
| 2004/0249779 A1 | 12/2004 | Nauck et al. |
| 2004/0260688 A1 | 12/2004 | Gross |
| 2004/0267774 A1 | 12/2004 | Lin et al. |
| 2005/0021394 A1 | 1/2005 | Miedema et al. |
| 2005/0114198 A1 | 5/2005 | Koningstein et al. |
| 2005/0131884 A1 | 6/2005 | Gross et al. |
| 2005/0144455 A1 | 6/2005 | Haitsma |
| 2005/0163375 A1 | 7/2005 | Grady |
| 2005/0172130 A1 | 8/2005 | Roberts |
| 2005/0177372 A1 | 8/2005 | Wang et al. |
| 2005/0238198 A1 | 10/2005 | Brown et al. |
| 2005/0238238 A1 | 10/2005 | Xu et al. |
| 2005/0245241 A1 | 11/2005 | Durand et al. |
| 2005/0249398 A1 | 11/2005 | Khamene et al. |
| 2005/0256820 A1 | 11/2005 | Dugan et al. |
| 2005/0262428 A1 | 11/2005 | Little et al. |
| 2005/0281439 A1 | 12/2005 | Lange |
| 2005/0289163 A1 | 12/2005 | Gordon et al. |
| 2005/0289590 A1 | 12/2005 | Cheok et al. |
| 2006/0004745 A1 | 1/2006 | Kuhn et al. |
| 2006/0013451 A1 | 1/2006 | Haitsma |
| 2006/0020860 A1 | 1/2006 | Tardif et al. |
| 2006/0020958 A1 | 1/2006 | Allamanche et al. |
| 2006/0026203 A1 | 2/2006 | Tan et al. |
| 2006/0033163 A1 | 2/2006 | Chen |
| 2006/0041596 A1 | 2/2006 | Stirbu et al. |
| 2006/0048191 A1 | 3/2006 | Xiong |
| 2006/0064037 A1 | 3/2006 | Shalon et al. |
| 2006/0112035 A1 | 5/2006 | Cecchi et al. |
| 2006/0129822 A1 | 6/2006 | Snijder et al. |
| 2006/0143674 A1 | 6/2006 | Jones et al. |
| 2006/0159442 A1 | 7/2006 | Kim et al. |
| 2006/0173688 A1 | 8/2006 | Whitham |
| 2006/0184638 A1 | 8/2006 | Chua et al. |
| 2006/0217818 A1 | 9/2006 | Fujiwara |
| 2006/0217828 A1 | 9/2006 | Hicken |
| 2006/0218191 A1 | 9/2006 | Gopalakrishnan |
| 2006/0224529 A1 | 10/2006 | Kermani |
| 2006/0236343 A1 | 10/2006 | Chang |
| 2006/0242130 A1 | 10/2006 | Sadri |
| 2006/0242139 A1 | 10/2006 | Butterfield et al. |
| 2006/0247983 A1 | 11/2006 | Dalli |
| 2006/0248558 A1 | 11/2006 | Barton |
| 2006/0253423 A1 | 11/2006 | McLane et al. |
| 2006/0288002 A1 | 12/2006 | Epstein et al. |
| 2007/0019864 A1 | 1/2007 | Koyama et al. |
| 2007/0022374 A1 | 1/2007 | Huang et al. |
| 2007/0033163 A1 | 2/2007 | Epstein et al. |
| 2007/0038614 A1 | 2/2007 | Guha |
| 2007/0042757 A1 | 2/2007 | Jung et al. |
| 2007/0061302 A1 | 3/2007 | Ramer et al. |

(56) References Cited

U.S. PATENT DOCUMENTS

| | | |
|---|---|---|
| 2007/0067304 A1 | 3/2007 | Ives |
| 2007/0067682 A1 | 3/2007 | Fang |
| 2007/0071330 A1 | 3/2007 | Oostveen et al. |
| 2007/0074147 A1 | 3/2007 | Wold |
| 2007/0083611 A1 | 4/2007 | Farago et al. |
| 2007/0091106 A1 | 4/2007 | Moroney |
| 2007/0130159 A1 | 6/2007 | Gulli et al. |
| 2007/0156720 A1 | 7/2007 | Maren |
| 2007/0168413 A1 | 7/2007 | Barletta et al. |
| 2007/0244902 A1 | 10/2007 | Seide et al. |
| 2007/0253594 A1 | 11/2007 | Lu et al. |
| 2007/0255785 A1 | 11/2007 | Hayashi et al. |
| 2007/0298152 A1 | 12/2007 | Baets |
| 2008/0013838 A1 † | 1/2008 | Lane |
| 2008/0046406 A1 | 2/2008 | Seide et al. |
| 2008/0049789 A1 | 2/2008 | Vedantham et al. |
| 2008/0072256 A1 | 3/2008 | Boicey et al. |
| 2008/0079729 A1 | 4/2008 | Brailovsky |
| 2008/0091527 A1 | 4/2008 | Silverbrook et al. |
| 2008/0152231 A1 | 6/2008 | Gokturk et al. |
| 2008/0159622 A1 | 7/2008 | Agnihotri et al. |
| 2008/0165861 A1 | 7/2008 | Wen |
| 2008/0201299 A1 | 8/2008 | Lehikoinen et al. |
| 2008/0201314 A1 | 8/2008 | Smith et al. |
| 2008/0201361 A1 | 8/2008 | Castro et al. |
| 2008/0228995 A1 | 9/2008 | Tan et al. |
| 2008/0237359 A1 | 10/2008 | Silverbrook et al. |
| 2008/0253737 A1 | 10/2008 | Kimura |
| 2008/0263579 A1 | 10/2008 | Mears et al. |
| 2008/0270373 A1 | 10/2008 | Dostveen et al. |
| 2008/0307454 A1 | 12/2008 | Ahanger et al. |
| 2008/0313140 A1 | 12/2008 | Pereira et al. |
| 2009/0013414 A1 | 1/2009 | Washington et al. |
| 2009/0022472 A1 | 1/2009 | Bronstein et al. |
| 2009/0024641 A1 | 1/2009 | Quigley et al. |
| 2009/0043637 A1 | 2/2009 | Eder |
| 2009/0043818 A1 | 2/2009 | Raichelgauz et al. |
| 2009/0125544 A1 | 5/2009 | Brindley |
| 2009/0157575 A1 | 6/2009 | Schobben et al. |
| 2009/0172030 A1 | 7/2009 | Schiff et al. |
| 2009/0175538 A1 | 7/2009 | Bronstein et al. |
| 2009/0208106 A1 | 8/2009 | Dunlop et al. |
| 2009/0216761 A1 | 8/2009 | Raichelgauz et al. |
| 2009/0245573 A1 | 10/2009 | Saptharishi et al. |
| 2009/0254572 A1 | 10/2009 | Redlich et al. |
| 2009/0277322 A1 | 11/2009 | Cai et al. |
| 2009/0282218 A1 | 11/2009 | Raichelgauz et al. |
| 2009/0297048 A1 | 12/2009 | Slotine et al. |
| 2010/0042646 A1 | 2/2010 | Raichelgauz et al. |
| 2010/0082684 A1 | 4/2010 | Churchill et al. |
| 2010/0104184 A1 | 4/2010 | Bronstein |
| 2010/0125569 A1 | 5/2010 | Nair |
| 2010/0162405 A1 | 6/2010 | Cook |
| 2010/0173269 A1 | 7/2010 | Puri et al. |
| 2010/0198626 A1 | 8/2010 | Cho et al. |
| 2010/0212015 A1 | 8/2010 | Jin et al. |
| 2010/0268524 A1 | 10/2010 | Nath et al. |
| 2010/0284604 A1 | 11/2010 | Chrysanthakopoulos |
| 2010/0306193 A1 | 12/2010 | Pereira et al. |
| 2010/0312736 A1 | 12/2010 | Kello |
| 2010/0318493 A1 | 12/2010 | Wessling |
| 2010/0325138 A1 | 12/2010 | Lee et al. |
| 2010/0325581 A1 | 12/2010 | Finkelstein et al. |
| 2011/0052063 A1 | 3/2011 | McAuley et al. |
| 2011/0055585 A1 | 3/2011 | Lee |
| 2011/0164180 A1 | 7/2011 | Lee |
| 2011/0164810 A1 | 7/2011 | Zang et al. |
| 2011/0218946 A1 | 9/2011 | Stern et al. |
| 2011/0246566 A1 | 10/2011 | Kashef et al. |
| 2011/0251896 A1 | 10/2011 | Impollonia et al. |
| 2011/0276680 A1 | 11/2011 | Rimon |
| 2011/0296315 A1 | 12/2011 | Lin et al. |
| 2011/0313856 A1 | 12/2011 | Cohen et al. |
| 2012/0082362 A1 | 4/2012 | Diem et al. |
| 2012/0131454 A1 | 5/2012 | Shah |
| 2012/0150890 A1 | 6/2012 | Jeong et al. |
| 2012/0167133 A1 | 6/2012 | Carroll |
| 2012/0179642 A1 | 7/2012 | Sweeney et al. |
| 2012/0185445 A1 | 7/2012 | Borden et al. |
| 2012/0197857 A1 | 8/2012 | Huang |
| 2012/0221470 A1 | 8/2012 | Lyon |
| 2012/0227074 A1 | 9/2012 | Hill et al. |
| 2012/0239690 A1 | 9/2012 | Asikainen et al. |
| 2012/0239694 A1 | 9/2012 | Avner et al. |
| 2012/0299961 A1 | 11/2012 | Ramkumar et al. |
| 2012/0301105 A1 | 11/2012 | Rehg et al. |
| 2009/0220138 A1 | 12/2012 | Zhang et al. |
| 2012/0330869 A1 | 12/2012 | Durham |
| 2012/0331011 A1 | 12/2012 | Raichelgauz et al. |
| 2013/0031489 A1 | 1/2013 | Gubin et al. |
| 2013/0066856 A1 | 3/2013 | Ong et al. |
| 2013/0067035 A1 | 3/2013 | Amanat et al. |
| 2013/0067364 A1 | 3/2013 | Berntson et al. |
| 2013/0080433 A1 | 3/2013 | Raichelgauz et al. |
| 2013/0086499 A1 | 4/2013 | Dyor et al. |
| 2013/0089248 A1 | 4/2013 | Remiszewski |
| 2013/0104251 A1 | 4/2013 | Moore et al. |
| 2013/0159298 A1 | 6/2013 | Mason et al. |
| 2013/0173635 A1 | 7/2013 | Sanjeev |
| 2013/0226930 A1 | 8/2013 | Amgren et al. |
| 2013/0283401 A1 | 10/2013 | Pabla et al. |
| 2013/0332951 A1 | 12/2013 | Gharaat et al. |
| 2014/0025692 A1 | 1/2014 | Pappas |
| 2014/0125703 A1 | 5/2014 | Roveta |
| 2014/0147829 A1 | 5/2014 | Jerauld |
| 2014/0152698 A1 | 6/2014 | Kim et al. |
| 2014/0169681 A1 | 6/2014 | Drake |
| 2014/0176604 A1 | 6/2014 | Venkitaraman et al. |
| 2014/0188786 A1 | 7/2014 | Raichelgauz et al. |
| 2014/0193077 A1 | 7/2014 | Shiiyama et al. |
| 2014/0250032 A1 | 9/2014 | Huang et al. |
| 2014/0282655 A1 | 9/2014 | Roberts |
| 2014/0300722 A1 | 10/2014 | Garcia |
| 2014/0310825 A1 | 10/2014 | Raichelgauz et al. |
| 2014/0330830 A1 | 11/2014 | Raichelgauz et al. |
| 2014/0341476 A1 | 11/2014 | Kulick et al. |
| 2015/0100562 A1 | 4/2015 | Kohlmeier et al. |
| 2015/0120627 A1 | 4/2015 | Hunzinger et al. |
| 2015/0154189 A1 | 6/2015 | Raichelgauz et al. |
| 2015/0254344 A1 | 9/2015 | Kulkarni et al. |
| 2015/0286742 A1 | 10/2015 | Zhang et al. |
| 2015/0289022 A1 | 10/2015 | Gross |
| 2015/0324356 A1 | 11/2015 | Gutierrez et al. |
| 2016/0007083 A1 | 1/2016 | Gurha |
| 2016/0026707 A1 | 1/2016 | Ong et al. |
| 2016/0239566 A1 | 8/2016 | Raichelgauz et al. |
| 2016/0306798 A1 | 10/2016 | Guo et al. |
| 2017/0017638 A1 | 1/2017 | Satyavarta et al. |
| 2017/0154241 A1 | 6/2017 | Shambik et al. |

FOREIGN PATENT DOCUMENTS

| | | |
|---|---|---|
| WO | 2003005242 A1 | 1/2003 |
| WO | 2003067467 A1 | 8/2003 |
| WO | 2004019527 A1 | 3/2004 |
| WO | 2005027457 A1 | 3/2005 |
| WO | 2007049282 A2 | 5/2007 |
| WO | 2014076002 A1 | 5/2014 |
| WO | 2014137337 A1 | 9/2014 |
| WO | 2016040376 A1 | 3/2016 |
| WO | 2016070193 A1 | 5/2016 |

OTHER PUBLICATIONS

Rui, Yong, et al. "Relevance feedback: a power tool for interactive content-based image retrieval." IEEE Transactions on circuits and systems for video technology 8.5 (1998): 644-655.*

Srihari, Rohini K. "Automatic indexing and content-based retrieval of captioned images." Computer 9 (1995): 49-56.*

Veltkamp, Remco C., Mirela Tanase, and Danielle Sent. "Features in content-based image retrieval systems: a survey." State-of-the-art in content-based image and video retrieval. Springer, Dordrecht, 2001. 97-124. (Year: 2001).*

(56) References Cited

OTHER PUBLICATIONS

Odinaev, et al., "Cliques in Neural Ensembles as Perception Carriers", Technion—Israel Institute of Technology, 2006 International Joint Conference on Neural Networks, Canada, 2006, pp. 285-292.
The International Search Report and the Written Opinion for PCT/US2016/054634 dated Mar. 16, 2017, ISA/RU, Moscow, RU.
Yanagawa, et al., "Columbia University's Baseline Detectors for 374 LSCOM Semantic Visual Concepts." Columbia University ADVENT technical report, 2007, pp. 222-2006-8.
Johnson, John L., "Pulse-Coupled Neural Nets: Translation, Rotation, Scale, Distortion, and Intensity Signal Invariance for Images." Applied Optics, vol. 33, No. 26, 1994, pp. 6239-6253.
Queluz, "Content-Based Integrity Protection of Digital Images", SPIE Conf. on Security and Watermarking of Multimedia Contents, San Jose, Jan. 1999, pp. 85-93, downloaded from http://proceedings.spiedigitallibrary.org/ on Aug. 2, 2017.
Schneider, et. al., "A Robust Content Based Digital Signature for Image Authentication", Proc. ICIP 1996, Laussane, Switzerland, Oct. 1996, pp. 227-230.
The International Search Report and the Written Opinion for PCT/US2016/050471, ISA/RU, Moscow, RU, dated May 4, 2017.
The International Search Report and the Written Opinion for PCT/US2017/015831, ISA/RU, Moscow, Russia, dated Apr. 20, 2017.
Liu, et al., "Instant Mobile Video Search With Layered Audio-Video Indexing and Progressive Transmission", Multimedia, IEEE Transactions on Year: 2014, vol. 16, Issue: 8, pp. 2242-2255, DOI: 10.1109/TMM.2014.2359332 IEEE Journals & Magazines.
Mladenovic, et al., "Electronic Tour Guide for Android Mobile Platform with Multimedia Travel Book", Telecommunications Forum (TELFOR), 2012 20th Year: 2012, pp. 1460-1463, DOI: 10.1109/TELFOR.2012.6419494 IEEE Conference Publications.
Park, et al., "Compact Video Signatures for Near-Duplicate Detection on Mobile Devices", Consumer Electronics (ISCE 2014), The 18th IEEE International Symposium on Year: 2014, pp. 1-2, DOI: 10.1109/ISCE.2014.6884293 IEEE Conference Publications.
Wang et al. "A Signature for Content-based Image Retrieval Using a Geometrical Transform", ACM 1998, pp. 229-234.
Zang, et al., "A New Multimedia Message Customizing Framework for Mobile Devices", Multimedia and Expo, 2007 IEEE International Conference on Year: 2007, pp. 1043-1046, DOI: 10.1109/ICME.2007.4284832 IEEE Conference Publications.
Li, et al., "Matching Commercial Clips from TV Streams Using a Unique, Robust and Compact Signature," Proceedings of the Digital Imaging Computing: Techniques and Applications, Feb. 2005, vol. 0-7695-2467, Australia.
May et al., "The Transputer", Springer-Verlag, Berlin Heidelberg, 1989, teaches multiprocessing system.
Nam, et al., "Audio Visual Content-Based Violent Scene Characterization", Department of Electrical and Computer Engineering, Minneapolis, MN, 1998, pp. 353-357.
Vailaya, et al., "Content-Based Hierarchical Classification of Vacation Images," I.E.E.E.: Multimedia Computing and Systems, vol. 1, 1999, East Lansing, MI, pp. 518-523.
Vallet, et al., "Personalized Content Retrieval in Context Using Ontological Knowledge," IEEE Transactions on Circuits and Systems for Video Technology, vol. 17, No. 3, Mar. 2007, pp. 336-346.
Whitby-Strevens, "The Transputer", 1985 IEEE, Bristol, UK.
Yanai, "Generic Image Classification Using Visual Knowledge on the Web," MM'03, Nov. 2-8, 2003, Tokyo, Japan, pp. 167-176.
Guo et al, "AdOn: An Intelligent Overlay Video Advertising System", SIGIR, Boston, Massachusetts, Jul. 19-23, 2009.
Mei, et al., "Contextual In-Image Advertising", Microsoft Research Asia, pp. 439-448, 2008.
Mei, et al., "VideoSense—Towards Effective Online Video Advertising", Microsoft Research Asia, pp. 1075-1084, 2007.
Semizarov et al. "Specificity of Short Interfering RNA Determined through Gene Expression Signatures", PNAS, 2003, pp. 6347-6352.
Brecheisen, et al., "Hierarchical Genre Classification for Large Music Collections", ICME 2006, pp. 1385-1388.
Lau, et al., "Semantic Web Service Adaptation Model for a Pervasive Learning Scenario", 2008 IEEE Conference on Innovative Technologies in Intelligent Systems and Industrial Applications Year: 2008, pp. 98-103, DOI: 10.1109/CITISIA.2008.4607342 IEEE Conference Publications.
McNamara, et al., "Diversity Decay in Opportunistic Content Sharing Systems", 2011 IEEE International Symposium on a World of Wireless, Mobile and Multimedia Networks Year: 2011, pp. 1-3, DOI: 10.1109/WoWMoM.2011.5986211 IEEE Conference Publications.
Santos, et al., "SCORM-MPEG: an Ontology of Interoperable Metadata for Multimedia and e-Learning", 2015 23rd International Conference on Software, Telecommunications and Computer Networks (SoftCOM) Year: 2015, pp. 224-228, DOI: 10.1109/SOFTCOM.2015.7314122 IEEE Conference Publications.
Wilk, et al., "The Potential of Social-Aware Multimedia Prefetching on Mobile Devices", 2015 International Conference and Workshops on Networked Systems (NetSys) Year: 2015, pp. 1-5, DOI: 10.1109/NetSys.2015.7089081 IEEE Conference Publications.
Chuan-Yu Cho, et al., "Efficient Motion-Vector-Based Video Search Using Query by Clip", 2004, IEEE, Taiwan, pp. 1-4.
Gomes et al., "Audio Watermaking and Fingerprinting: For Which Applications?" University of Rene Descartes, Paris, France, 2003.
Ihab Al Kabary, et al., "SportSense: Using Motion Queries to Find Scenes in Sports Videos", Oct. 2013, ACM, Switzerland, pp. 1-3.
Jianping Fan et al., "Concept-Oriented Indexing of Video Databases: Towards Semantic Sensitive Retrieval and Browsing", IEEE, vol. 13, No. 7, Jul. 2004, pp. 1-19.
Shih-Fu Chang, et al., "VideoQ: A Fully Automated Video Retrieval System Using Motion Sketches", 1998, IEEE, , New York, pp. 1-2.
Wei-Te Li et al., "Exploring Visual and Motion Saliency for Automatic Video Object Extraction", IEEE, vol. 22, No. 7, Jul. 2013, pp. 1-11.
Zhu et al., Technology-Assisted Dietary Assessment. Computational Imaging VI, edited by Charles A. Bauman, Eric L. Miller, Ilya Pollak, Proc. of SPIE-IS&T Electronic Imaging, SPIE vol. 6814, 681411, Copyright 2008 SPIE-IS&T. pp. 1-10.
Clement, et al. "Speaker Diarization of Heterogeneous Web Video Files: A Preliminary Study", Acoustics, Speech and Signal Processing (ICASSP), 2011, IEEE International Conference on Year: 2011, pp. 4432-4435, DOI: 10.1109/ICASSP.2011.5947337 IEEE Conference Publications, France.
Gong, et al., "A Knowledge-based Mediator for Dynamic Integration of Heterogeneous Multimedia Information Sources", Video and Speech Processing, 2004, Proceedings of 2004 International Symposium on Year: 2004, pp. 167-470, DOI: 10.1109/ISIMP.2004.1434102 IEEE Conference Publications, Hong Kong.
Lin, et al., "Robust Digital Signature for Multimedia Authentication: A Summary", IEEE Circuits and Systems Magazine, 4th Quarter 2003, pp. 23-26.
Lin, et al., "Summarization of Large Scale Social Network Activity", Acoustics, Speech and Signal Processing, 2009, ICASSP 2009, IEEE International Conference on Year 2009, pp. 3481-3484, DOI: 10.1109/ICASSP.2009.4960375, IEEE Conference Publications, Arizona.
Nouza, et al., "Large-scale Processing, Indexing and Search System for Czech Audio-Visual Heritage Archives", Multimedia Signal Processing (MMSP), 2012, pp. 337-342, IEEE 14th Intl. Workshop, DOI: 10.1109/MMSP.2012.6343465, Czech Republic.
Zhou et al, "Medical Diagnosis With C4.5 Rule Preceded by Artificial Neural Network Ensemble", IEEE Transactions on Information Technology in Biomedicine, vol. 7, Issue: 1, Mar. 2003, pp. 37-42.
Zhu et al., "Technology-Assisted Dietary Assesment", Proc SPIE. Mar. 20, 2008, pp. 1-15.
Zou et al., "A Content-Based Image Authentication System with Lossless Data Hiding", ICME 2003, pp. 213-216.
Big Bang Theory Series 04 Episode 12, aired Jan. 6, 2011; [retrieved from Internet: ].
Boari et al, "Adaptive Routing for Dynamic Applications in Massively Parallel Architectures", 1995 IEEE, Spring 1995, pp. 1-14.
Burgsteiner et al., "Movement Prediction from Real-World Images Using a Liquid State machine", Innovations in Applied Artificial

(56) References Cited

OTHER PUBLICATIONS

Intelligence Lecture Notes in Computer Science, Lecture Notes in Artificial Intelligence, LNCS, Springer-Verlag, BE, vol. 3533, Jun. 2005, pp. 121-130.
Cernansky et al, "Feed-forward Echo State Networks", Proceedings of International Joint Conference on Neural Networks, Montreal, Canada, Jul. 31-Aug. 4, 2005, pp. 1-4.
Fathy et al, "A Parallel Design and Implementation for Backpropagation Neural Network Using MIMD Architecture", 8th Mediterranean Electrotechnical Conference, 19'96. MELECON '96, Date of Conference: May 13-16, 1996, vol. 3 pp. 1472-1475, vol. 3.
Freisleben et al, "Recognition of Fractal Images Using a Neural Network", Lecture Notes in Computer Science, 1993, vol. 6861, 1993, pp. 631-637.
Garcia, "Solving the Weighted Region Least Cost Path Problem Using Transputers", Naval Postgraduate School, Monterey, California, Dec. 1989.
Hogue, "Tree Pattern Inference and Matching for Wrapper Induction on the World Wide Web", Master's Thesis, Massachusetts Institute of Technology, Jun. 2004, pp. 1-106.
Hogue, "Tree Pattern Inference and Matching for Wrapper Induction on the World Wide Web", Master's Thesis, Massachusetts institute of Technology, 2004, pp. 1-106.
Howlett et al, "A Multi-Computer Neural Network Architecture in a Virtual Sensor System Application", International journal of knowledge-based intelligent engineering systems, 4 (2). pp. 86-93, 133N 1327-2314.
Hua et al., "Robust Video Signature Based on Ordinal Measure", Image Processing, 2004, 2004 International Conference on Image Processing (ICIP), vol. 1, IEEE, pp. 685-688, 2004.
International Search Report and Written Opinion for PCT/US2016/050471, ISA/RU, Moscow, RU, dated May 4, 2017.
International Search Report and Written Opinion for PCT/US2016/054634, ISA/RU, Moscow, RU, dated Mar. 16, 2017.
International Search Report and Written Opinion for PCT/US2017/015831, ISA/RU, Moscow, RU, dated Apr. 20, 2017.
Johnson et al, "Pulse-Coupled Neural Nets: Translation, Rotation, Scale, Distortion, and Intensity Signal Invariance for Images", Applied Optics, vol. 33, No. 26, 1994, pp. 6239-6253.
Lau et al., "Semantic Web Service Adaptation Model for a Pervasive Learning Scenario", 2008 IEEE Conference on Innovative Technologies in Intelligent Systems and Industrial Applications, 2008, pp. 98-103.
Lin et al., "Generating robust digital signature for image/video authentication", Multimedia and Security Workshop at ACM Multimedia '98, Bristol, U.K., Sep. 1998, pp. 245-251.
Lu et al, "Structural Digital Signature for Image Authentication: An Incidental Distortion Resistant Scheme", IEEE Transactions on Multimedia, vol. 5, No. 2, Jun. 2003, pp. 161-173.
Lyon, "Computational Models of Neural Auditory Processing", IEEE International Conference on Acoustics, Speech, and Signal Processing, ICASSP '84, Date of Conference: Mar. 1984, vol. 9, pp. 41-44.
May et al, "The Transputer", Springer-Verlag Berlin Heidelberg 1989, vol. 41.
McNamara et al., "Diversity Decay in opportunistic Content Sharing Systems", 2011 IEEE International Symposium on a World of Wireless, Mobile and Multimedia Networks, pp. 1-3.
Morad et al., "Performance, Power Efficiency and Scalability of Asymmetric Cluster Chip Multiprocessors", Computer Architecture Letters, vol. 4, Jul. 4, 2005, pp. 1-4, XP002466254.
Nagy et al, "A Transputer, Based, Flexible, Real-Time Control System for Robotic Manipulators", UKACC International Conference on Control '96, Sep. 2-5, 1996, Conference Publication No. 427, IEE 1996.
Natschlager et al., "The "Liquid Computer": A novel strategy for real-time computing on time series", Special Issue on Foundations of Information Processing of telematik, vol. 8, No. 1, 2002, pp. 39-43, XP002466253.

Odinaev et al, "Cliques in Neural Ensembles as Perception Carriers", Technion—Institute of Technology, 2006 International Joint Conference on neural Networks, Canada, 2006, pp. 285-292.
Ortiz-Boyer et al, "CIXL2: A Crossover Operator for Evolutionary Algorithms Based on Population Features", Journal of Artificial Intelligence Research 24 (2005) Submitted Nov. 2004; published Jul. 2004, pp. 1-48.
Queluz, "Content-Based Integrity Protection of Digital Images", SPIE Conf. on Security and Watermarking of Multimedia Contents, San Jose, Jan. 1999, pp. 85-93.
Santos et al., "SCORM-MPEG: an Ontology of Interoperable Metadata for multimediaand E-Learning", 23rd International Conference on Software, Telecommunications and Computer Networks (SoftCom), 2015, pp. 224-228.
Scheper et al, "Nonlinear dynamics in neural computation", ESANN'2006 proceedings—European Symposium on Artificial Neural Networks, Bruges (Belgium), Apr. 26-28, 2006, d-side publication, ISBN 2-930307-06-4, pp. 1-12.
Schneider et al, "A Robust Content based Digital Signature for Image Authentication", Proc. ICIP 1996, Lausane, Switzerland, Oct. 1996, pp. 227-230.
Srihari et al., "Intelligent Indexing and Semantic Retrieval of Multimodal Documents", Kluwer Academic Publishers, May 2000, vol. 2, Issue 2-3, pp. 245-275.
Srihari, Rohini K. "Automatic indexing and content-based retrieval of captioned images" Computer 0 (1995): 49-56.
Stolberg et al, "Hibrid-SOC: A Mul Ti-Core SOC Architecture for Mul Timedia Signal Processing", 2003 IEEE, pp. 189-194.
Theodoropoulos et al, "Simulating Asynchronous Architectures on Transputer Networks", Proceedings of the Fourth Euromicro Workshop on Parallel and Distributed Processing, 1996. PDP '96, pp. 274-281.
Verstraeten et al, "Isolated word recognition with the Liquid State Machine: a case study", Department of Electronics and Information Systems, Ghent University, Sint-Pietersnieuwstraat 41, 9000 Gent, Belgium, Available onlline Jul. 14, 2005, pp. 521-528.
Wang et al., "Classifying Objectionable Websites Based onImage Content", Stanford University, pp. 1-12.
Ware et al, "Locating and Identifying Components in a Robot's Workspace using a Hybrid Computer Architecture" Proceedings of the 1995 IEEE International Symposium on Intelligent Control, Aug. 27-29, 1995, pp. 139-144.
Whitby-Strevens, "The transputer", 1985 IEEE, pp. 292-300.
Wilk et al., "The Potential of Social-Aware Multimedia Prefetching on Mobile Devices", International Conference and Workshops on networked Systems (NetSys), 2015, pp. 1-5.
Yanagawa et al, "Columbia University's Baseline Detectors for 374 LSCOM Semantic Visual Concepts", Columbia University ADVENT Technical Report # 222-2006-8, Mar. 20, 2007, pp. 1-17.
Yanagawa et al., "Columbia University's Baseline Detectors for 374 LSCOM Semantic Visual Concepts", Columbia University ADVENT Technical Report #222, 2007, pp. 2006-2008.
Zhou et al, "Ensembling neural networks: Many could be better than all", National Laboratory for Novel Software Technology, Nanjing University, Hankou Road 22, Nanjing 210093, PR China Received Nov. 16, 2001, Available online Mar. 12, 2002, pp. 239-263.
"Computer Vision Demonstration Website", Electronics and Computer Science, University of Southampton, 2005, USA.
Chinchor, Nancy A. et al.; Multimedia Analysis + Visual Analytics = Multimedia Analytics; IEEE Computer Society; 2010; pp. 52-60. (Year: 2010).
Guo et al, AdOn: An Intelligent Overlay Video Advertising System (Year: 2009).
Li et al ("Matching Commercial Clips from TV Streams Using a Unique, Robust and Compact Signature" 2005) (Year: 2005).
Marian Stewart B et al., "Independent component representations for face recognition", Proceedings of the SPIE Symposium on Electronic Imaging: Science and Technology; Conference on Human Vision and Electronic Imaging III, San Jose, California, Jan. 1998, pp. 1-12.

(56) References Cited

OTHER PUBLICATIONS

Ortiz-Boyer et al, "CIXL2: A Crossover Operator for Evolutionary Algorithms Based on Population Features", Journal of Artificial Intelligence Research 24 (2005) Submitted Nov. 2004; published Jul. 2005, pp. 1-48.
Pandya etal. A Survey on QR Codes: in context of Research and Application. International Journal of Emerging Technology and U Advanced Engineering. ISSN 2250-2459, ISO 9001:2008 Certified Journal, vol. 4, Issue 3, Mar. 2014 (Year: 2014).
Stolberg et al ("Hibrid-SOC: A Multi-Core SOC Architecture for Multimedia Signal Processing" 2003).
Vallet et al ("Personalized Content Retrieval in Context Using Ontological Knowledge" Mar. 2007) (Year: 2007).
Ma et el. ("Semantics modeling based image retrieval system using neural networks" 2005 (Year: 2005).

\* cited by examiner
† cited by third party

SYSTEM AND METHOD FOR RECOGNIZING CHARACTERS IN MULTIMEDIA CONTENT

CROSS-REFERENCE TO RELATED APPLICATIONS

This application claims the benefit of U.S. Provisional Application No. 61/948,050 filed on Mar. 5, 2014. This application is a continuation-in-part (CIP) of U.S. patent application Ser. No. 14/096,865 filed on Dec. 4, 2013, now pending, which claims the benefit of U.S. Provisional Patent Application No. 61/890,251 filed on Oct. 13, 2013. The Ser. No. 14/096,865 application is a CIP of U.S. patent application Ser. No. 13/624,397 filed on Sep. 21, 2012, now pending. The Ser. No. 13/624,397 application is a CIP of:
 (a) U.S. patent application Ser. No. 13/344,400 filed on Jan. 5, 2012, now U.S. Pat. No. 8,959,037, which is a continuation of U.S. patent application Ser. No. 12/434, 221, filed on May 1, 2009, now U.S. Pat. No. 8,112, 376;
 (b) U.S. patent application Ser. No. 12/195,863, filed on Aug. 21, 2008, now U.S. Pat. No. 8,326,775, which claims priority under 35 USC 119 from Israeli Application No. 185414, filed on Aug. 21, 2007, and which is also a continuation-in-part of the below-referenced U.S. patent application Ser. No. 12/084,150; and,
 (c) U.S. patent application Ser. No. 12/084,150 having a filing date of Apr. 7, 2009, now U.S. Pat. No. 8,655, 801, which is the National Stage of International Application No. PCT/IL2006/001235 filed on Oct. 26, 2006, which claims foreign priority from Israeli Application No. 171577 filed on Oct. 26, 2005 and Israeli Application No. 173409 filed on Jan. 29, 2006.

All of the applications referenced above are herein incorporated by reference.

TECHNICAL FIELD

The present disclosure relates generally to the analysis of multimedia content, and more specifically to recognizing natural language characters appearing in multimedia content items.

BACKGROUND

Identification of textual content embedded in multimedia content is a challenging problem with many practical applications. Currently available optical character recognition (OCR) systems are mainly used in order to recognize such textual content. However, such solutions are insufficient in cases where the input content is not properly scanned, captured or printed into an accurate computer-readable text.

In additional, prior art solutions may have difficulty recognizing textual content that is in an unexpected font type and/or a particularly small font size (e.g., smaller than 12 point font). Inability of such solutions to appropriately identify textual content may lead to data loss and/or decreased efficiency as a result of compensating for such data loss.

It would therefore be advantageous to provide a solution that would overcome the deficiencies of the prior art by recognizing natural language character in multimedia content.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all embodiments. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a method for recognizing characters embedded in multimedia content. The method comprises extracting at least one image of at least one character from a received multimedia content item; identifying a natural language character corresponding to the at least one image of the at least one character, wherein the identification is performed by a deep content classification (DCC) system; and storing the identified natural language character in a data warehouse.

Certain embodiments disclosed herein also include a system for recognizing characters embedded in multimedia content. The system comprises an interface to a network for receiving a multimedia content item; a processor; a memory connected to the processor, wherein the memory contains instructions that, when executed by the processor, configure the system to: extract at least one image of at least one character from the received multimedia content item; identify a natural language character corresponding to the at least one image of the at least one character, wherein the identification is performed by a deep content classification (DCC) system; and store the identified natural language character in a data warehouse.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
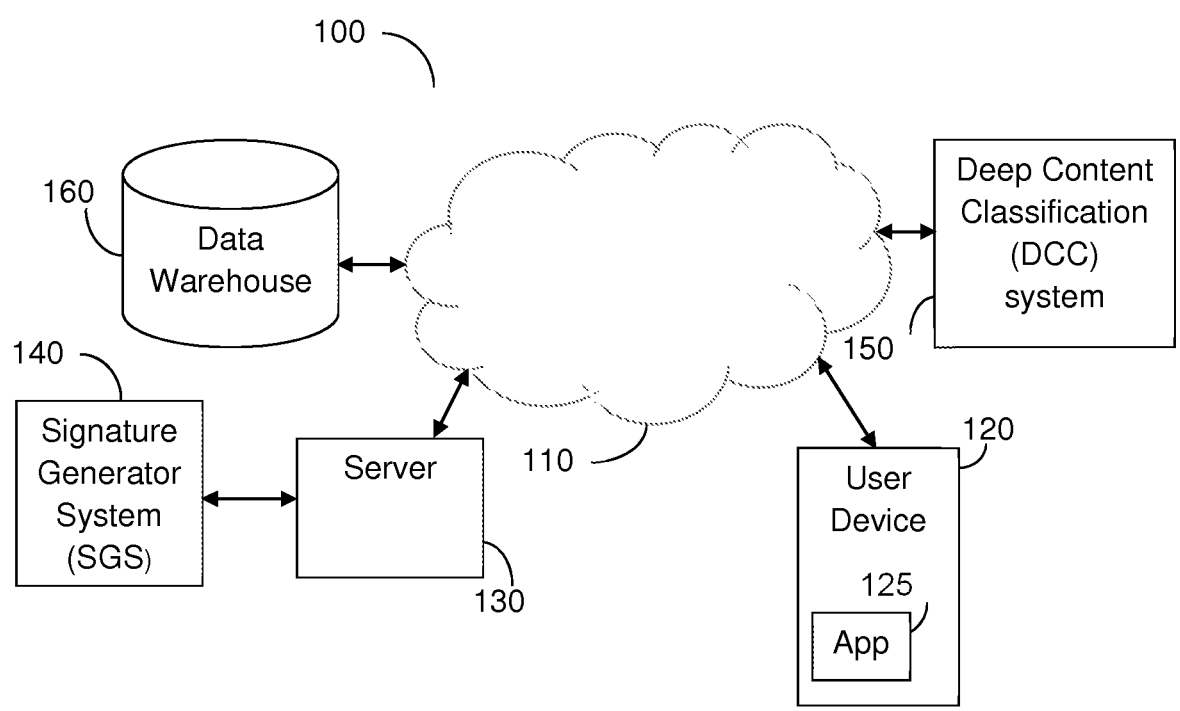
FIG. 1 is a schematic block diagram of a network system utilized to describe the various embodiments disclosed herein.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for recognizing natural language characters embedded in multimedia content. The natural language characters may be, for example, one or more letters in a natural language, numbers, and so on. The multimedia content item in which the natural language characters are embedded is received, and at least an image of each character is extracted therefrom. At least one natural language character corresponding to the image of the character is identified, using for example, a deep content classification (DCC) system. The natural language character is then stored for further use.

According to one embodiment, a sequence of characters of a natural language embedded in multimedia content is compared to a library of words stored in a memory. In that embodiment, word in the natural language that compares positively with the sequence of characters of at least a natural language respective of the comparison results is stored in the memory for further use.

FIG. 1 shows an exemplary and non-limiting schematic diagram of a network system 100 utilized to describe the various embodiments disclosed herein. A network 110 is used to communicate between different parts of the network system 100. The network 110 may be the Internet, the world-wide-web (WWW), a local area network (LAN), a wide area network (WAN), a metro area network (MAN), and another network capable of enabling communication between the elements of the system 100.

Further connected to the network 110 is a user device 120 configured to execute at least one application 125. The application 125 may be, for example, a web browser, a script, or any other application configured to interact with a server 130. The user device 120 may be, but is not limited to, a personal computer (PC), a personal digital assistant (PDA), a mobile phone, a smart phone, a tablet computer, a laptop, a wearable computing device, or another kind of computing device equipped with browsing, viewing and managing capabilities that is enabled as further discussed herein below. It should be noted that only one user device 120 and one application 125 are illustrated in FIG. 1 merely for the sake of simplicity and without limitation on the generality of the disclosed embodiments. Additional user devices and/or applications may be utilized without departing from the scope of the disclosed embodiments.

The network system 100 also includes a data warehouse 160 configured to store at least one multimedia content item in which characters, natural language characters in a variety of natural languages, a plurality of words in natural languages, and the like may be embedded. In the embodiment illustrated in FIG. 1, the server 130 communicates with the data warehouse 160 through the network 110. In other non-limiting configurations, the server 130 may be directly connected to the data warehouse 160.

The various embodiments disclosed herein are realized using the server 130, a signature generator system (SGS) 140 that is communicatively connected to the server 130, and a deep-content-classification (DCC) system 150. The SGS 140 may be connected to the server 130 directly or through the network 110. The server 130 is configured to receive and serve at least one multimedia content item in which at least one character is embedded. The server 130 extracts at least one image of the at least one character from the multimedia content item.

The DCC system 150 is configured to identify at least one natural language character corresponding to the image of the at least one character. According to one embodiment, the identification comprises generation of concept structures (or concepts) and identification of concepts that correspond to the image of the at least one character. A concept is a collection of signatures representing a multimedia element and metadata describing the concept. The collection is a signature reduced cluster generated by inter-matching the signatures generated for the many multimedia elements, clustering the inter-matched signatures, and providing a reduced cluster set of such clusters. As a non-limiting example, a 'Superman concept' is a signature reduced cluster of signatures describing elements (such as multimedia elements) related to, e.g., a Superman cartoon: a set of metadata including textual representations of the Superman concept.

Techniques for generating concepts and concept structures are described further in U.S. Pat. No. 8,266,185 (hereinafter the '185 Patent) to Raichelgauz, et al., which is assigned to a common assignee, and is hereby incorporated by reference for all that it contains. In an embodiment, the DCC system 150 is configured to operate as the DCC system discussed in the '185 patent. The process of generating the signatures in the SGS 140 is explained in more detail herein below with respect to FIGS. 3 and 4.

In certain configurations, the DCC system 150 and SGS 140 may be embedded in the server 130. It should be noted that each of the server 130, the SGS 140, and the DCC system 150 typically comprises a processing unit. The memory contains instructions that can be executed by the processor. The server 130 also includes an interface (not shown) to the network 110.

In one embodiment, the processing unit may be realized through architecture of computational cores as described in further detail herein below. In another embodiment, the processing unit may comprise, or be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing unit may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing unit, cause the processing unit to perform the various functions described herein.

According to the disclosed embodiments, the server 130 is configured to receive a multimedia content item in which at least one character is embedded from the user device 120. The multimedia content item may be, but is not limited to, an image, a graphic, a video stream, a video clip, a video frame, a photograph, and/or combinations thereof and portions thereof. In one embodiment, the server 130 receives a URL of a web-page viewed by the user device 120 and accessed by the application 125. The web-page is processed to extract the multimedia content item contained therein. The request to analyze the multimedia content item can be sent by a script executed in the web-page such as the application 125 (e.g., a web server or a publisher server)

when requested to upload one or more multimedia content items to the web-page. Such a request may include a URL of the web-page or a copy of the web-page. The application 125 can also send a picture or a video clip taken by a user of the user device 120 to the server 130.

The server 130, in response to receiving the multimedia content item, is configured to extract at least one image of the at least one character. The server 130 identifies at least one natural language character corresponding to the least one image. The at least one natural language character is stored in a data warehouse 160 for further use. According to one embodiment, the at least one corresponding natural language character is provided to the user device 120 by the server 130. According to yet another embodiment, the server 130 is further configured to compare a sequence of characters of at least a natural language embedded in a multimedia content item to a library of words stored in the data warehouse 160. The word(s) in the natural language that positively compares with the sequence of characters of at least a natural language respective of the comparison results is then stored in the data warehouse 160 for further use.

As a non-limiting example, when the server 130 receives a multimedia content item in which the sequence of characters: m, o, r, n, i, n and g, are embedded, an image of the sequence is extracted by the server 130. Then, the sequence is compared to a plurality of words stored in the data warehouse 160. The word "morning" in English is determined as positive comparing to the sequence of characters. The comparison results are then stored in the data warehouse 160 for further use.

Figure 2:
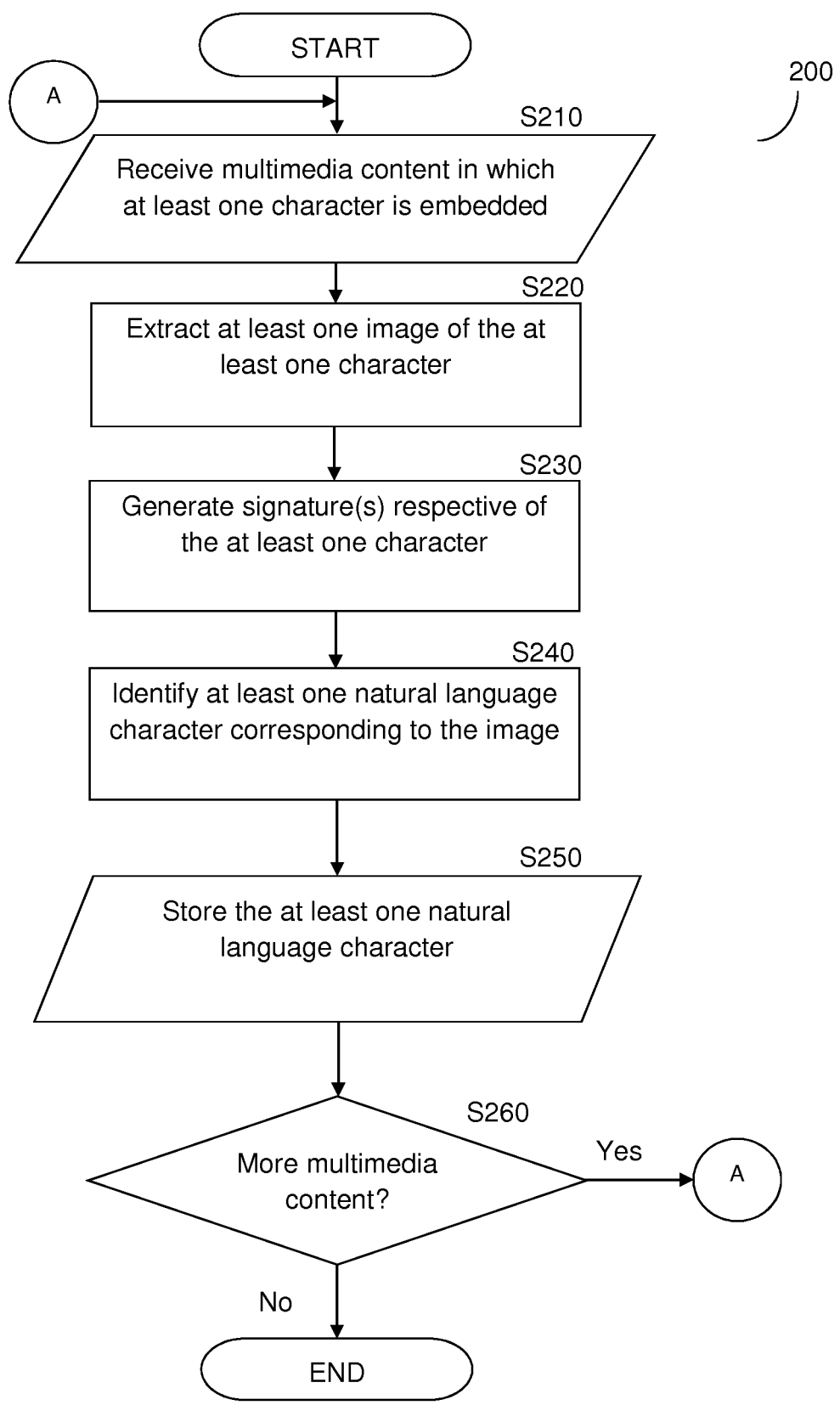
FIG. 2 is a flowchart describing a method for recognizing natural language characters embedded in multimedia content according to one embodiment.

FIG. 2 depicts an exemplary and non-limiting flowchart 200 describing a method for recognizing natural language characters embedded in multimedia content items according to an embodiment. In an embodiment, the method may be performed by the server 130.

In S210, a multimedia content item in which at least one character is embedded is received. In an embodiment, the multimedia content item is received together with a request to identify the character(s) embedded in the multimedia content item. The multimedia content item may be, but is not limited to, an image, a graphic, a video stream, a video clip, a video frame, a photograph, a combination thereof, and a portion thereof.

In S220, at least one image of the at least one character is extracted from the at least one multimedia content item. The at least one multimedia content item may contain multiple sets of at least one character (e.g., multiple words, multiple sentences, multiple paragraphs, multiple phrases, portions thereof, and so on), each of which may be represented by an image. In an embodiment, each image of the at least one multimedia content item may be extracted based on an extraction order. The extraction order may be, e.g., left to right, right to left, top to bottom, bottom to top, paragraphs before sentences, sentences before phrases, phrases before words, combinations thereof, and so on.

In S230, at least one signature for the extracted at least one image is generated to the at least one character. The signatures are generated by the SGS 140 as described in greater detail herein below with respect to FIGS. 3 and 4.

In S240, at least a natural language character corresponding to the extracted image of the at least one character is identified. In an embodiment, a DCC system (e.g., the DCC system 150) may be queried respective of the desired identification. In such an embodiment, the DCC system returns at least a natural language character corresponding to the extracted image and the returned at least a natural language character is identified as corresponding to the extracted image. According to an embodiment, the identification is made through a data warehouse (e.g., the data warehouse 160). According to another embodiment, the identification is made through one or more data sources accessible over a network (e.g., the network 110).

According to one embodiment, returning at least a natural language character corresponding to the extracted image further includes generating concept structures (or concepts) and identifying concepts that correspond to the image of the at least one character. Techniques for generating concepts and concept structures are described further in the '185 Patent referenced above. Returning a natural language character corresponding to an image is described further herein below with respect to FIG. 5.

In S250, the at least one natural language character corresponding to the extracted image is stored. In an embodiment, the at least one natural language character is stored in a data warehouse (e.g., the data warehouse 160). In S260, it is checked whether additional multimedia content items have been received and, if so, execution continues with S210; otherwise, execution terminates.

Figure 3:
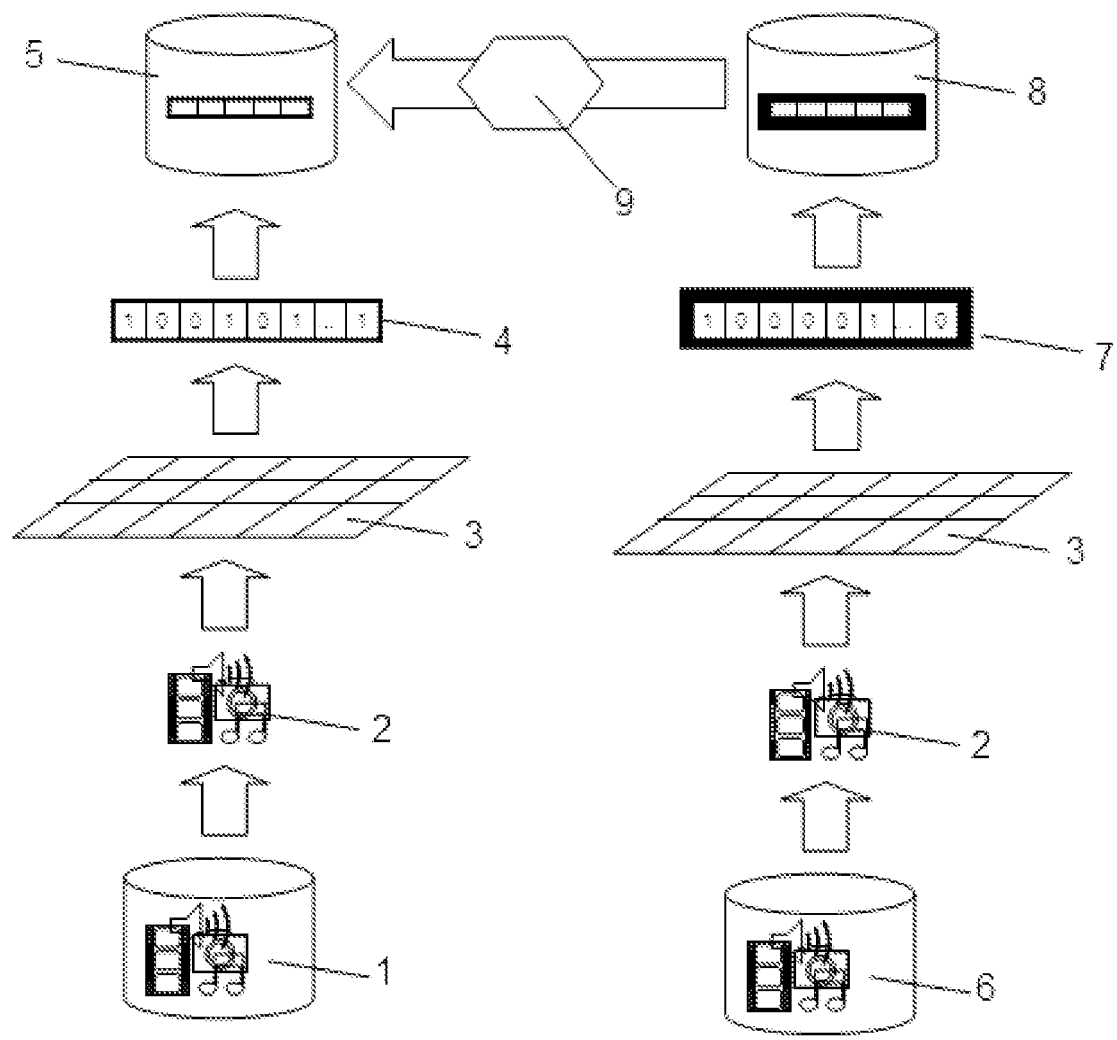
FIG. 3 is a block diagram depicting the basic flow of information in the signature generator system.
Figure 4:
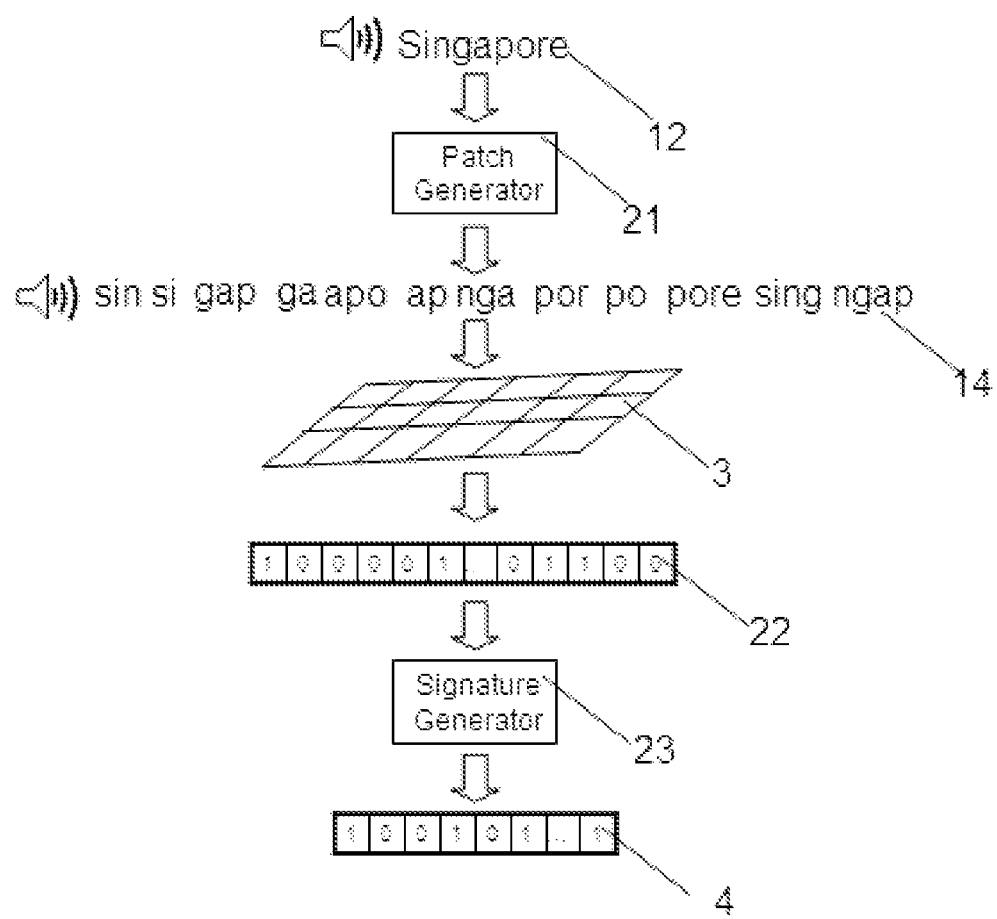
FIG. 4 is a diagram showing the flow of patches generation, response vector generation, and signature generation in a large-scale speech-to-text system.

FIGS. 3 and 4 illustrate the generation of signatures for multimedia content items according to one embodiment. An exemplary high-level description of the process for large scale matching is depicted in FIG. 3. In this example, the matching is conducted based on video content.

Video content segments 2 from a Master database (DB) 6 and a Target DB 1 are processed in parallel by a large number of independent computational Cores 3 that constitute an architecture for generating the Signatures (hereinafter the "Architecture"). Further details on the generation of computational Cores are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 4. Finally, Target Robust Signatures and/or Signatures are effectively matched, by a matching algorithm 9, to Master Robust Signatures and/or Signatures database to find all matches between the two databases.

To demonstrate an example of the signature generation process, it is assumed, merely for the sake of simplicity and without limitation on the generality of the disclosed embodiments, that the signatures are based on a single frame, leading to certain simplification of the computational cores generation. The Matching System is extensible for signatures generation capturing dynamics in-between the frames.

The Signatures' generation process is now described with reference to FIG. 4. The first step in the process of signatures generation from a given speech-segment is to breakdown the speech-segment to K patches 14 of random length P and random position within the speech segment 12. The breakdown is performed by the patch generator component 21. The value of the number of patches K, random length P, and random position parameters is determined based on optimization, considering the tradeoff between accuracy rate and the number of fast matches required in the flow process of the server 130 and SGS 140. Thereafter, all the K patches are injected in parallel into all computational Cores 3 to generate K response vectors 22, which are fed into a signature generator system 23 to produce a database of Robust Signatures and Signatures 4.

In order to generate Robust Signatures, i.e., Signatures that are robust to additive noise L (where L is an integer equal to or greater than 1) by the Computational Cores 3 a frame 'i' is injected into all the Cores 3. Then, Cores 3 generate two binary response vectors: $\vec{S}$, which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core $Ci=\{n_i\}$ ($1 \le i \le L$) may consist of a single leaky integrate-to-threshold unit (LTU) node or more nodes. The node $n_i$ equations are:

$$V_i = \sum_j w_{ij} k_j$$

$$n_i = \prod (Vi - Th_x)$$

where, $\prod$ is a Heaviside step function; $w_{ij}$ is a coupling node unit (CNU) between node i and image component j (for example, grayscale value of a certain pixel j); $k_j$ is an image component T (for example, grayscale value of a certain pixel j); $Th_X$ is a constant Threshold value, where 'x' is 'S' for Signature and 'RS' for Robust Signature; and $V_i$ is a Coupling Node Value.

The Threshold values $Th_X$ are set differently for Signature generation than for Robust Signature generation. For example, for a certain distribution of Vi values (for the set of nodes), the thresholds for Signature ($Th_S$) and Robust Signature ($Th_{RS}$) are set apart, after optimization, according to at least one or more of the following criteria:

1: For: $V_i > Th_{RS}$
   $1-p(V > Th_S)-1-(1-\varepsilon)^l \ll 1$
i.e., given that I nodes (cores) constitute a Robust Signature of a certain image I, the probability that not all of these I nodes will belong to the Signature of same, but noisy image, $\tilde{I}$ is sufficiently low (according to a system's specified accuracy).

2: $p(V_i > Th_{RS}) \approx 1/L$
i.e., approximately 1 out of the total L nodes can be found to generate a Robust Signature according to the above definition.

3: Both Robust Signature and Signature are generated for certain frame i.

It should be understood that the generation of a signature is unidirectional, and typically yields lossless compression, where the characteristics of the compressed data are maintained but the uncompressed data cannot be reconstructed. Therefore, a signature can be used for the purpose of comparison to another signature without the need for comparison to the original data. A detailed description of the Signature generation can be found in U.S. Pat. Nos. 8,326,775 and 8,312,031, both assigned to common assignee, which are hereby incorporated by reference for all the useful information they contain.

A Computational Core generation is a process of definition, selection, and tuning of the parameters of the cores for a certain realization in a specific system and application. The process is based on several design considerations, such as:

(a) The Cores should be designed so as to obtain maximal independence, i.e., the projection from a signal space should generate a maximal pair-wise distance between any two cores' projections into a high-dimensional space.

(b) The Cores should be optimally designed for the type of signals, i.e., the Cores should be maximally sensitive to the spatio-temporal structure of the injected signal, for example, and in particular, sensitive to local correlations in time and space. Thus, in some cases, a core represents a dynamic system, such as in state space, phase space, edge of chaos, etc., which is uniquely used herein to exploit its maximal computational power.

(c) The Cores should be optimally designed with regard to invariance to a set of signal distortions, of interest in relevant applications.

Figure 5:
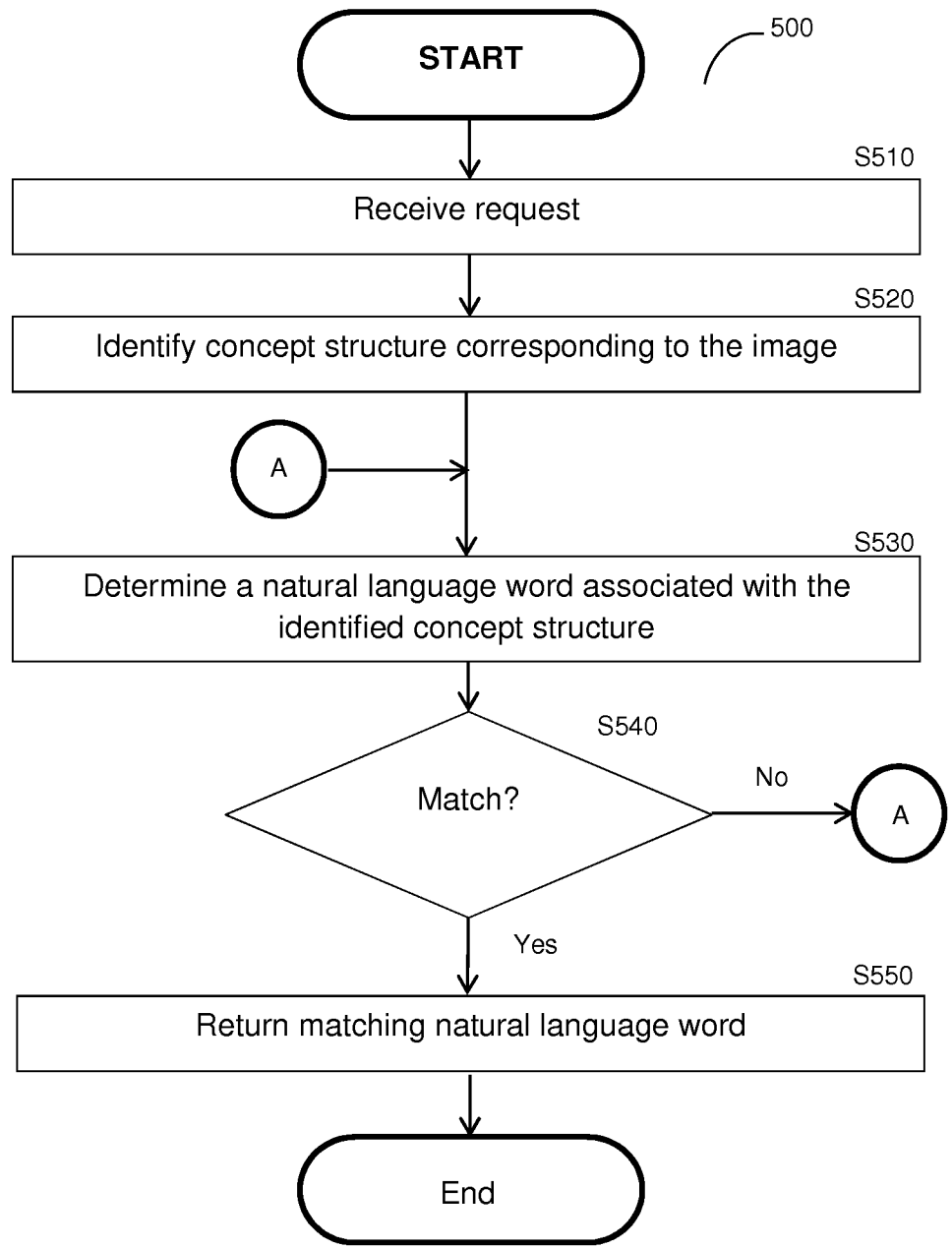
FIG. 5 is a flowchart illustrating a method returning a natural language character corresponding to an image according to an embodiment.

FIG. 5 is an exemplary and non-limiting flowchart 500 illustrating returning a natural language character corresponding to an image according to an embodiment. In an embodiment, the steps of flowchart 500 may be performed by a deep content classification (DCC) system (e.g., the DCC system 150).

In S510, a request to return at least a natural language character corresponding to an image is received. In a typical embodiment, the request may further include the image and a signature that was generated based on the image. In an alternative embodiment, the image and a signature generated based on the image may be found. The image may be found in, but is not limited to, a data warehouse (e.g., the data warehouse 160), one or more data sources accessible over a network (e.g., the network 110), and so on.

In S520, a concept structure corresponding to the image is identified. The concept structure may be identified as corresponding to the image if, e.g., matching between the signature of the image and each concept signature of at least one multimedia content item within a concept structure is above a predefined threshold. In an embodiment, if no existing concept structure matches the signature of the image, a new concept structure may be generated respective thereof.

A concept is a collection of signatures representing a multimedia element and metadata describing the concept. The collection is a signature reduced cluster generated by inter-matching the signatures generated for the many multimedia elements, clustering the inter-matched signatures, and providing a reduced cluster set of such clusters. As a non-limiting example, a 'Superman concept' is a signature reduced cluster of signatures describing elements (such as multimedia elements) related to, e.g., a Superman cartoon: a set of metadata including textual representations of the Superman concept.

In S530, a natural language word associated with the identified concept structure is determined. In an embodiment, the associations between concept structures and natural language words may be stored in, but not limited to, a data warehouse (e.g., the data warehouse 160).

In S540, the determined natural language word is compared to the image to determine if there is a match and, if so, execution continues with S550; otherwise, execution continues with S530. A match may be determined if, e.g., a signature of the determined natural language word matches a signature of the image above a predefined threshold. In a typical embodiment, the threshold for determining if a signature of the determined natural language word matches the signature of the image is higher than the threshold for determining if multimedia content items of a concept structure match the signature of the image. Signatures and signature matching are described further herein above with respect to FIGS. 3 and 4.

In S550, the matching natural language word is returned. In an embodiment, if no natural language words match, an error message may be returned.

As a non-limiting example, a request to return at least a natural language character corresponding to an image is received, wherein the image includes the word "motorcycle." The request includes the image and a signature generated respective of the image. The signature is matched to at least one signature of a multimedia content item associated with a concept structure, wherein the concept structure is "motor vehicles." Based on the signature matching with the concept structure, it is determined that the "motor vehicles" concept structure corresponds to the image of the word "motorcycle" because the signatures match above a 50% matching threshold.

The signature of the image is compared to signatures of natural language words associated with the concept structure until a match is found. A signature of the natural word "motorcycle" is determined to match the signature of the image containing the word "motorcycle" because the signatures match above a 90% matching threshold. Thus, it is determined that the natural language word "motorcycle" represents the at least a character in the image. The natural language word "motorcycle" is returned.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, embodiments, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for recognizing characters embedded in multimedia content, comprising:
    extracting at least one image of at least one character from a received multimedia content item;
    identifying a natural language character corresponding to the at least one image of the at least one character, wherein the identification is performed by a deep content classification (DCC) system;
    comparing a first signature of a first image of at least one first natural language character to at least one second signature of at least one second multimedia content item within a concept structure, a matching concept structure being identified if matching between the first signature of the first image and the at least one second signature of the at least one second multimedia content item within the concept structure is above a first threshold;
    comparing the first signature of the first image to a plurality of signatures of a plurality of natural language words associated with the matching concept structure until a match is found above a second threshold yielding a matching natural language word of the plurality of natural words;
    wherein the second threshold exceeds the first threshold; and
    storing the identified natural language character in a data warehouse.

2. The method of claim 1, further comprising:
    comparing a sequence of the natural language character to a library of natural language words;
    detecting a natural language word in the library of natural language words that matches the sequence of natural language characters; and
    storing the detected natural language word in the data warehouse.

3. The method of claim 1, wherein the multimedia content item is received from a user device.

4. The method of claim 3, further comprising: sending the natural language character to the user device.

5. The method of claim 1, wherein the at least one multimedia content item is any one of: an image, a graphic, a video stream, a video clip, a video frame, and a photograph.

6. The method of claim 1, further comprising:
    generating at least one signature respective of the at least one character; and
    querying the DCC system using the at least on generated signature to identify the natural language character corresponding to the image of the at least one character.

7. The method of claim 6, further comprising: identifying a concept structure corresponding to the image based on the at least one signature, wherein the identified natural language character is associated with the identified concept structure.

8. The method of claim 1, wherein each image of the extracted at least one image is extracted based on an extraction order.

9. The method of claim 1, wherein the extraction order is at least any of: left to right, right to left, top to bottom, bottom to top, paragraphs before sentences, sentences before phrases, and phrases before words.

10. A non-transitory computer readable medium having stored thereon instructions for causing one or more processing units to execute the method according to claim 1.

11. A system for recognizing characters embedded in multimedia content, comprising:
    an interface to a network for receiving a multimedia content item;
    a processor;
    a memory connected to the processor,
    wherein the memory contains instructions that, when executed by the processor, configure the system to:
        extract at least one image of at least one character from the received multimedia content item;
        identify a natural language character corresponding to the at least one image of the at least one character, wherein the identification is performed by a deep content classification (DCC) system;
        compare a first signature of a first image of at least one first natural language character to at least one second signature of at least one second multimedia content item within a concept structure, a matching concept structure being identified if matching between the first signature of the first image and the at least one second signature of the at least one second multimedia content item within the concept structure is above a first threshold;

compare the first signature of the first image to a plurality of signatures of a plurality of natural language words associated with the matching concept structure until a match is found above a second threshold yielding a matching natural language word of the plurality of natural words; wherein the second threshold exceeds the first threshold;

and store the identified natural language character in a data warehouse.

12. The system of claim 11, wherein the system is further configured to: compare a sequence of the at least a natural language character to a library of natural language words; detect a natural language word in the library of natural language words that matches the sequence of natural language characters; and store the detected natural language word in the data warehouse.

13. The system of claim 11, wherein the multimedia content item is received from a user device.

14. The system of claim 13, wherein the system is further configured to: send the natural language character to the user device.

15. The system of claim 11, wherein the at least one multimedia content item is any one of: an image, a graphic, a video stream, a video clip, a video frame, and a photograph.

16. The system of claim 11, wherein the system is further configured to: generate at least one signature respective of the at least one character; and querying the DCC system using the at least on generated signature to identify the natural language character corresponding to the image of the at least one character.

17. The system of claim 16, wherein the system is further configured to: identify a concept structure corresponding to the image based on the at least one signature, wherein the identified natural language character is associated with the identified concept structure.

18. The system of claim 11, wherein each image of the extracted at least one image is extracted based on an extraction order.

19. The system of claim 11, wherein the extraction order is at least any one of: left to right, right to left, top to bottom, bottom to top, paragraphs before sentences, sentences before phrases, and phrases before words.

20. The method according to claim 1 wherein the first signature represents a response of leaky integrate-to-threshold unit nodes to the first image.

21. The method according to claim 1 comprising generating the first signature by a plurality of mutually independent computational cores.

22. The method according to claim 1 wherein the concept structure comprises signatures of objects of different type that share a property.

23. The method according to claim 1 wherein the concept structure comprises signature reduced cluster.

24. The method according to claim 1 wherein the concept structure comprises signatures of different types of motor vehicles.

* * * * *